(12) United States Patent
Ozaki

(10) Patent No.: US 7,936,781 B2
(45) Date of Patent: *May 3, 2011

(54) BANDWIDTH CONTROL APPARATUS, BANDWIDTH CONTROL METHOD, AND BANDWIDTH CONTROL SYSTEM

(75) Inventor: Hirokazu Ozaki, Tokyo (JP)

(73) Assignee: NEC Corporation, Tokyo (JP)

( * ) Notice: Subject to any disclaimer, the term of this patent is extended or adjusted under 35 U.S.C. 154(b) by 1130 days.

This patent is subject to a terminal disclaimer.

(21) Appl. No.: 11/447,043

(22) Filed: Jun. 6, 2006

(65) Prior Publication Data

US 2006/0280168 A1    Dec. 14, 2006

(30) Foreign Application Priority Data

Jun. 10, 2005 (JP) ................... 2005-171107

(51) Int. Cl.
*H04J 1/16* (2006.01)
(52) U.S. Cl. ........................... 370/468; 370/537
(58) Field of Classification Search .................. 370/235, 370/468, 537, 252
See application file for complete search history.

(56) References Cited

U.S. PATENT DOCUMENTS

| 6,785,288 B1 * | 8/2004 | Enns et al. ............... 370/401 |
| 6,873,618 B1 * | 3/2005 | Weaver ..................... 370/390 |
| 7,136,353 B2 * | 11/2006 | Ha et al. .................. 370/230 |
| 7,236,483 B2 * | 6/2007 | Yeom ....................... 370/352 |
| 7,483,380 B2 * | 1/2009 | Metke ...................... 370/238 |
| 7,539,211 B2 * | 5/2009 | Oh et al. ................... 370/468 |
| 2004/0052248 A1 * | 3/2004 | Frank et al. ............. 370/352 |
| 2005/0018697 A1 * | 1/2005 | Enns et al. .............. 370/401 |
| 2006/0280123 A1 * | 12/2006 | Ozaki ...................... 370/235 |

FOREIGN PATENT DOCUMENTS

| EP | 1 341 350 A1 | 9/2003 |
| JP | 2004-519974 A | 7/2004 |
| JP | 2005-236423 A | 9/2005 |
| WO | WO 02/089459 A1 | 11/2002 |
| WO | WO 03/009541 A1 | 1/2003 |

* cited by examiner

*Primary Examiner* — William Trost, IV
*Assistant Examiner* — Roberta A Shand
(74) *Attorney, Agent, or Firm* — Sughrue Mion, PLLC

(57) ABSTRACT

The present invention provides a bandwidth control apparatus, a bandwidth control method, and a bandwidth control system for effective utilization of bandwidths resource in data transmission. The bandwidth control apparatus measures downstream effective bit rate of own access lines and notifies downstream effective bit rate information of each access line to a remote bandwidth control apparatus which communicates with the bandwidth control apparatus via a network. The bandwidth control apparatus allocates and controls upstream bandwidths of own access lines on the basis of corresponding downstream effective bit rate information of access lines notified from remote bandwidth control apparatus via the networks.

21 Claims, 10 Drawing Sheets

| ACCESS LINE (USER TERMINAL) | SOURCE IP ADDRESS | TCP SOURCE PORT NUMBER |
|---|---|---|
| 510 | 10.24.48.1 | 80 |
| | 10.24.48.1 | 1024 |
| | 10.24.48.2 | 2001 |
| | 10.24.48.2 | 80 |
| 511 | 10.24.49.1 | 1001 |
| 512 | 10.24.50.1 | 2001 |
| 513 | 10.24.50.2 | 2101 |
| 514 | 10.24.50.3 | 2201 |
| 515 | 10.24.50.4 | 2301 |
| 516 | 10.24.50.5 | 2401 |

BANDWIDTH CONTROL APPARATUS, BANDWIDTH CONTROL METHOD, AND BANDWIDTH CONTROL SYSTEM

BACKGROUND OF THE INVENTION

1. Field of the Invention

The present invention relates to a bandwidth control apparatus, a bandwidth control method, and a bandwidth control system for data transfer, and, more particularly to a bandwidth control apparatus, a bandwidth control method, a bandwidth control system applicable to subscriber data transfer systems of an x Digital Subscriber Line (x DSL) such as an Asymmetric Digital Subscriber Line (ADSL), a Symmetric digital Subscriber Line (SDSL), or a Very high-bit-rate Digital Subscriber Line (VDSL) and Fiber To The x (FTTx) such as Fiber To The Building (FTTB), Fiber To The Curb (FTTC), Fiber To The Cabinet (FTTC), or Fiber To The Home (FTTH). The x Digital Subscriber Line (x DSL) uses a metallic cable for a transmission medium to make it possible to perform high-bit-rate data transmission at several Megabits/second. The Fiber To The x (FTTx) uses an optical fiber cable for a transmission medium to make it possible to perform high-bit-rate data transmission at several tens Megabits to hundred Megabits/second.

2. Description of the Related Art

An overview of a general transmission system will be provided with reference to FIG. 1. FIG. 1 is a diagram showing an example of a network configuration of an Internet service provider including an access multiplexer.

Personal computers (PCs) 111 are placed in, for example, user homes. The PCs 111 connect to subscriber lines 109 serving as access lines through Customer Premises Equipment (CPE) 110. An Access Multiplexer (AM) 106 in a switching system terminates the subscriber lines and concentrates signals of the subscriber lines into a high-bit-rate transmission signal 105.

The AM 106 has a Line Termination Unit (LTU) 108 and an Integrated Gateway Unit (IGU) 107. The LTU 108 terminates the subscriber lines 109 which are the access lines from the user premises. The IGU 107 multiplexes a signal and performs protocol conversion for the signal as required.

The AM 106 transmits the multiplexed high-bit-rate transmission signal 105 to a switch or a router 104. Upstream signals from the PCs 111 in the user premises are transmitted to the Internet 103 through the CPE 110, the AM 106, and the switch or the router 104. Downstream signals from the Internet 103 to the PCs 111 are transmitted on a reversed route to the route from the PCs 111 to the Internet 103, that is, a route through the switch or the router 104, the AM 106, and the CPE 110.

A change of a usage pattern of the Internet and a change of a traffic pattern which is caused by the change of the usage pattern will be explained with reference to FIGS. 2 and 3. In FIGS. 2 and 3, a router or a switch is not shown because the router or the switch is unnecessary for explanation.

FIG. 2 is a diagram schematically showing a constitution of an Internet system including a server 201, a network 202, an access multiplexer 203, a multiplexed signal 204, access lines 205, and user terminals 206 in user premises, that is, the Internet for explaining a conventional typical usage pattern of the Internet.

The conventional typical usage pattern of the Internet is a client/server type in which the user terminals 206 in the user premises connect to the server 201 on the Internet 202. For example, users use the Internet in order to connect to the server 201 from the user terminals 206 and obtain information on the server 201. In such a usage pattern of the client/server type, upstream and downstream traffics are asynchronous. Specifically, the downstream traffics are extremely large compared with the upstream traffics. In other words, the downstream traffics are dominant in total traffics.

Therefore, in the conventional research and technology development for bandwidth control, researchers focused attention on bandwidth control for the downstream traffics that were dominant on the access lines 205 and had very little interest in bandwidth control for the upstream traffics.

In addition to the conventional usage pattern of the Internet shown in FIG. 2, in recent years, a new usage pattern of the Internet is increasing. FIG. 3 is a diagram schematically showing a constitution of the Internet for explaining the new usage pattern of the Internet that is frequently used in recent years.

The usage pattern of the Internet frequently used in recent years is Peer to Peer (P2P). Video conference, file exchange, and the like are typical applications of the P2P. In the case of the P2P, user terminals 301, 305, and 307 in FIG. 3 communicate with one another on equal ground over a network 303 via access multiplexers (AMs) 302, 304, and 306. In the usage pattern of the Internet of the P2P type, upstream traffics and downstream traffics are roughly equal. Therefore, bandwidth control for the upstream traffics becomes important for fairness of traffic allocation among users or for providing guaranteed bandwidth to each user.

Bandwidth control among access lines will be explained with reference to FIG. 3.

Many access lines represented by the xDSL provide services to users on a best effort basis. In the best effort services, a transmission rate of each of the user terminals 301, 305, and 307, that is, an effective rate, fluctuates depending on distances among the user terminals 301, 305, and 307, states of the access lines serving as transmission paths, and differences of conditions such as performance of the user terminals 301, 305, and 307.

For delivering the downstream traffics to each user terminal, the AMs 302, 304, and 306 usually transmit a multiplexed signal from the network 303 using broadcast to all of the access lines accommodated in each of the AMs 302, 304, and 306. Because of the broadcast, all of downstream bandwidth resources in the AMs 302, 304, and 306 are always shared by all of access lines accommodated in each of the AMs 302, 304, and 306. Therefore, the AMs 302, 304, and 306 can not perform bandwidth control on downstream for the access lines 308, 309, and 310 individually and optimize bandwidth allocation among the access lines any longer.

On the other hand, on the upstream traffics, signals are individually transmitted from the respective user terminals 301, 305, and 307 to the AMs 302, 304, and 306 using unicast. The AMs 302, 304, and 306 multiplex upstream signals from the user terminals 301, 305, and 307 and send out to the network 303. Therefore, concerning the upstream traffics, the AMs 302, 304, and 306 are able to perform bandwidth control for each of the access lines 308, 309, and 310 to adjust bandwidth allocation among the access lines. For example, if a user terminal uses out an upstream bandwidth and floods some of upstream traffic to bandwidth of the other user terminals, the AMs 302, 304, and 306 are capable of limiting bandwidths to equal to the respective access lines to provide fair service to each of the users.

However, a static bandwidth allocation of upstream traffics to the respective access lines, including the above-mentioned case which allocates the bandwidth evenly to the respective access lines for providing equal service to the users, may cause the waste of network resources. For example, the network resources are wasted when one end of downstream effective rate of the access line for any of user terminals 301, 305, and 307 which is transmitting data is lower than the other end of upstream bandwidths statically allocated to the access line of the user terminal which is receiving data from the other end.

When flow control is performed in this case, transmitting user terminal sends out data only at rate equal to or lower than the effective rate at the receiving user terminal and the statically allocated upstream bandwidth of transmitting side have a surplus. As a result, the surplus of the upstream bandwidths resources allocated statically to the line of the transmitting user terminal goes to waste. On the other hand, when flow control is not performed, regardless of transmitted data arrival at the receiving user terminals 301, 305, and 307, the transmitting user terminals send out data to the remote end at own rate. When the transmitting user terminal sends out data at a rate higher than the effective rates at receiving user terminals 301, 305, and 307, data sent out from transmitting user terminal is discarded at AMs 302, 304 and 306 before reaching the corresponding receiving end of user terminals 301, 305, and 307. As a result, the AMs 302, 304, and 306 waste bandwidth resources of the upstream for unnecessary transmission of data that do not reach the receiving user terminals 301, 305, and 307.

For another example, if bandwidth resources are allocated statically to access lines when communications among the user terminals 301, 305, and 307 is closed, bandwidth resources also goes to waste. Because even though communications among user terminals is closed and corresponding access lines of the user terminals becomes idle, bandwidth resources are still allocated fixedly to the idle access lines and not to reallocated to other busy access lines used by the other terminals.

In the method of statically bandwidths allocation for access lines in this way, it is difficult to use the bandwidths resources effectively according to communications states of the respective access lines.

As a related technical document, a technique concerning the xDSL entitled "Data Transmission Network" is disclosed in Japanese Patent Application Laid-Open No. 2004-519974 corresponding to the International Publication No. WO 02/089459 A1 of the PCT. This technology relates to a data transmission network for data transmission which allows xDSL data transmission and voice data transmission between a backbone network and a network termination device on any data transmission medium such as a copper telephone line. However, the document does not disclose a technique related to bandwidth control.

SUMMARY OF THE INVENTION

The invention has been devised in view of the circumstances and it is an object of the invention to provide a bandwidth control apparatus, a bandwidth control method, and a bandwidth control system that make it possible to realize effective utilization of bandwidths in data transmission.

Respective bandwidth control apparatuses connected to be opposed to one another via a network collect bandwidth states of downstream access lines and notify remote bandwidth control apparatuses of the bandwidth state of the downstream access lines collected. The local bandwidth control apparatuses allocate upstream bandwidths of access lines controlled by the local bandwidth control apparatuses on the basis of bandwidth states acquired from the remote bandwidth control apparatuses and control the upstream bandwidths of the access lines in accordance with the bandwidth allocated.

According to the invention, the respective bandwidth control apparatuses connected to be opposed to one another via the network allocate bandwidths of access lines controlled by the local bandwidth control apparatus according to bandwidth states of access lines controlled by the remote bandwidth control apparatus, and control the bandwidths of the access lines on the basis of the bandwidths allocated. This makes it possible to realize effective utilization of bandwidths.

BRIEF DESCRIPTION OF THE DRAWINGS

The above and other purposes, features and advantages of the present invention will be more apparent from the following detailed description when taken in conjunction with the accompanying drawings wherein:

FIG. 10 is a diagram showing an access line correspondence table in the bandwidth control apparatus according to the exemplary aspect of the present invention.

DETAILED DESCRIPTION OF THE EXEMPLARY ASPECTS

A bandwidth control system according to an exemplary aspect of the present invention is a bandwidth control system that dynamically and optimally controls, when a transmission apparatus that accommodates a plurality of access lines and concentrates the access lines into a line connected to a network is communicating with other transmission apparatuses through the network, bandwidths of the respective access lines. A bandwidth control apparatus according to this exemplary aspect is included in the respective transmission apparatuses connected to one another via the network. In the following explanation, the transmission apparatus is not specifically referred to and it is treated that the transmission apparatus is integrated into the bandwidth control apparatus.

Figure 1:
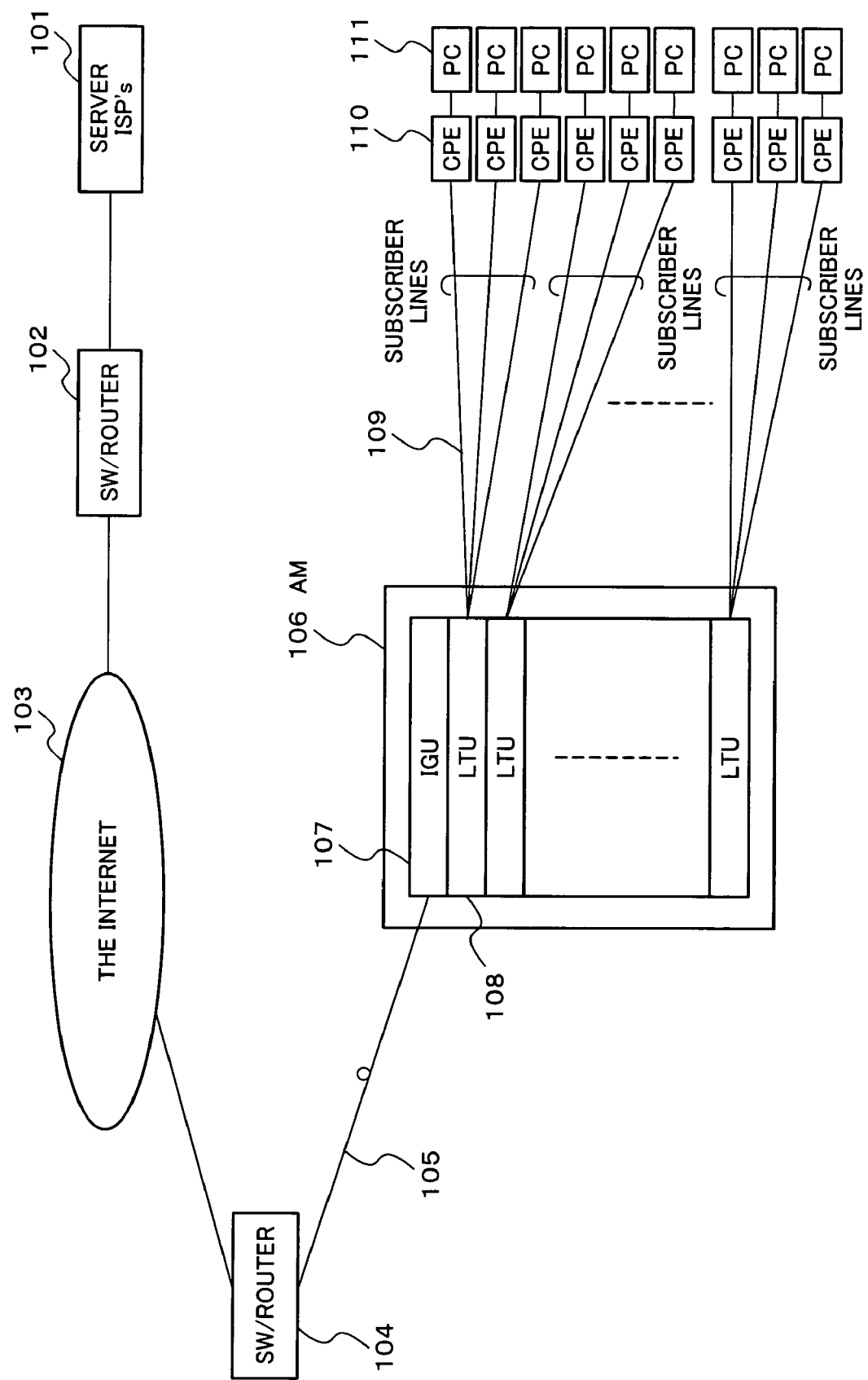
FIG. 1 is a diagram showing a system constitution to which the conventional access multiplexer is applied.
Figure 2:
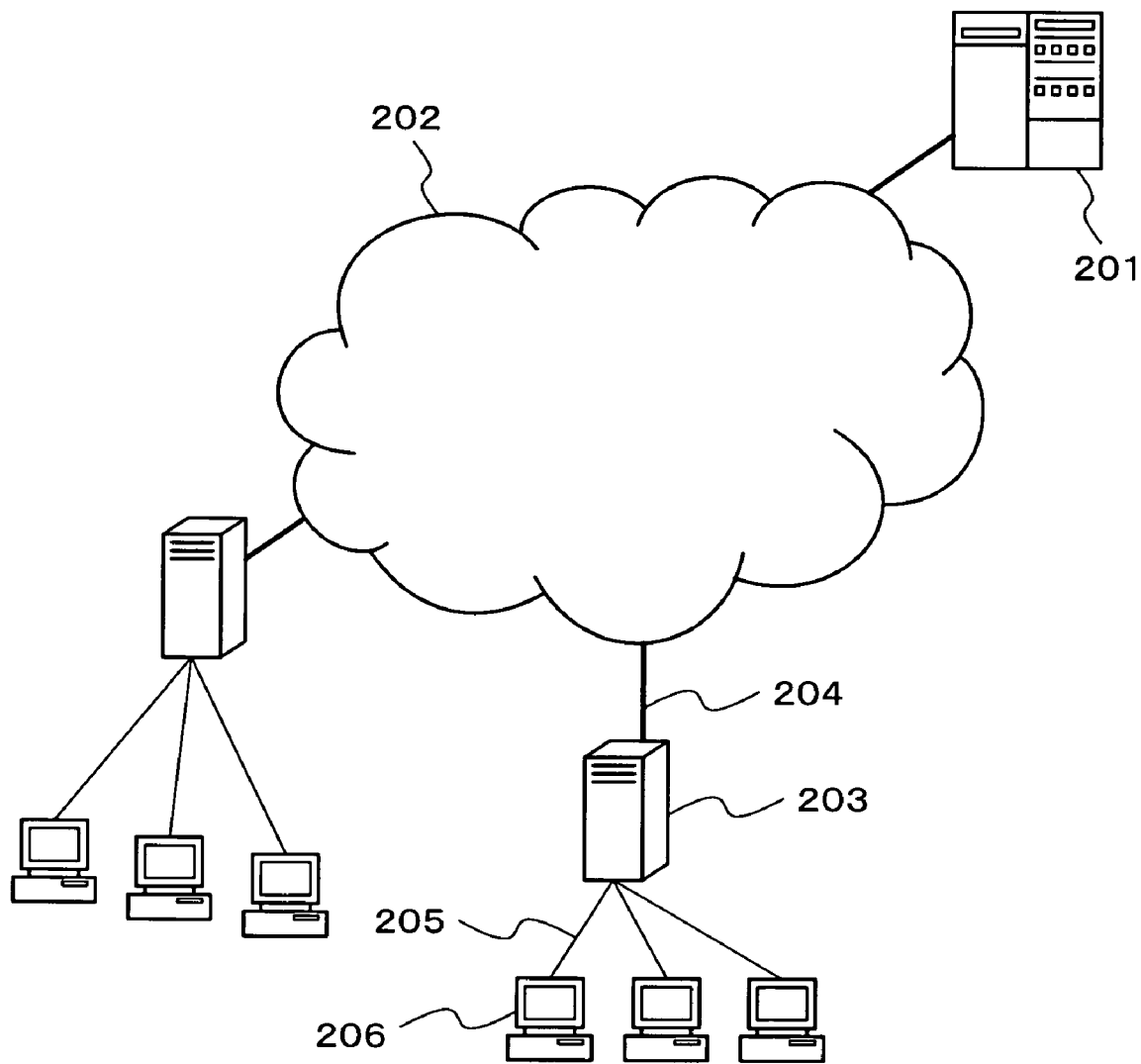
FIG. 2 is a diagram showing a system constitution of a communications pattern of a client/server type.
Figure 3:
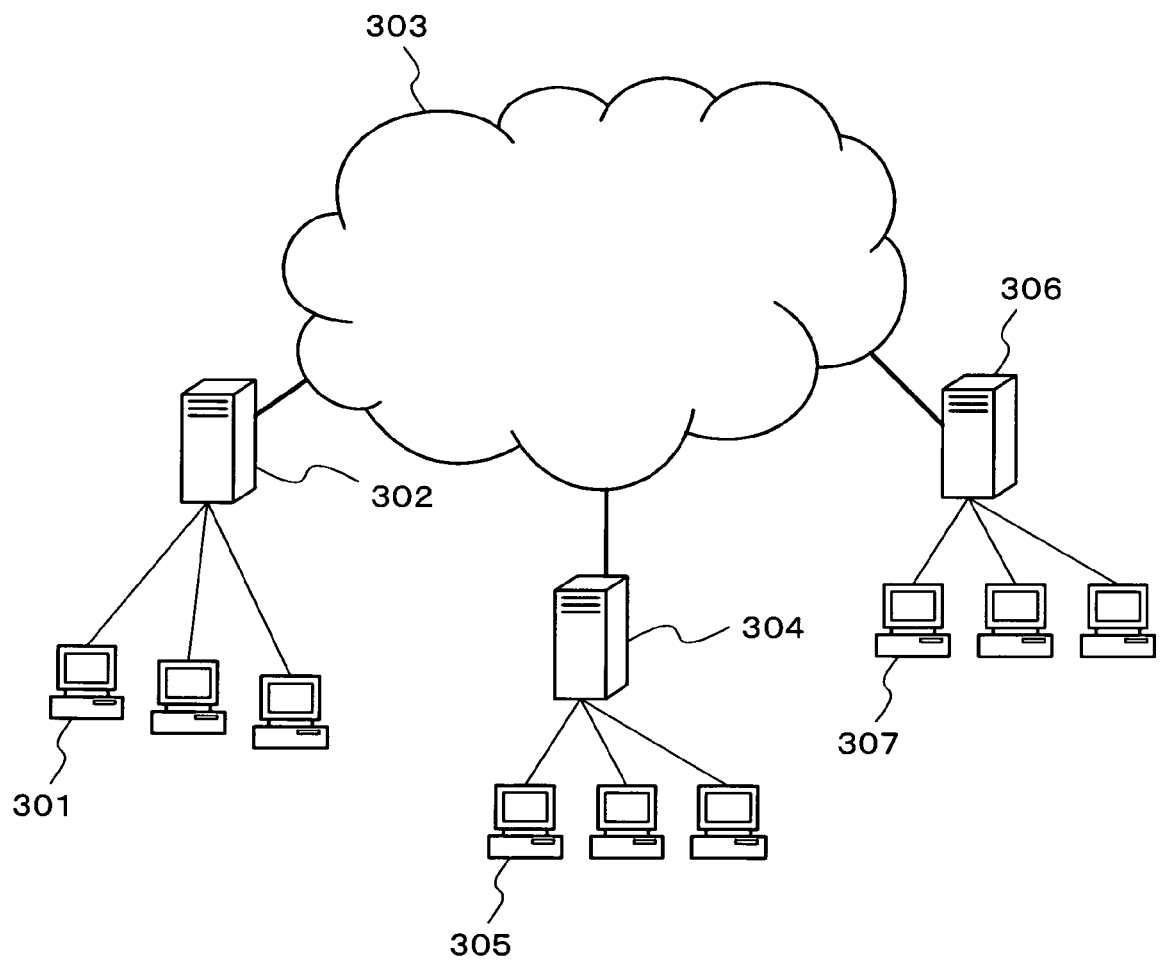
FIG. 3 is a diagram showing a system constitution of a communications pattern of a peer to peer type.
Figure 4:
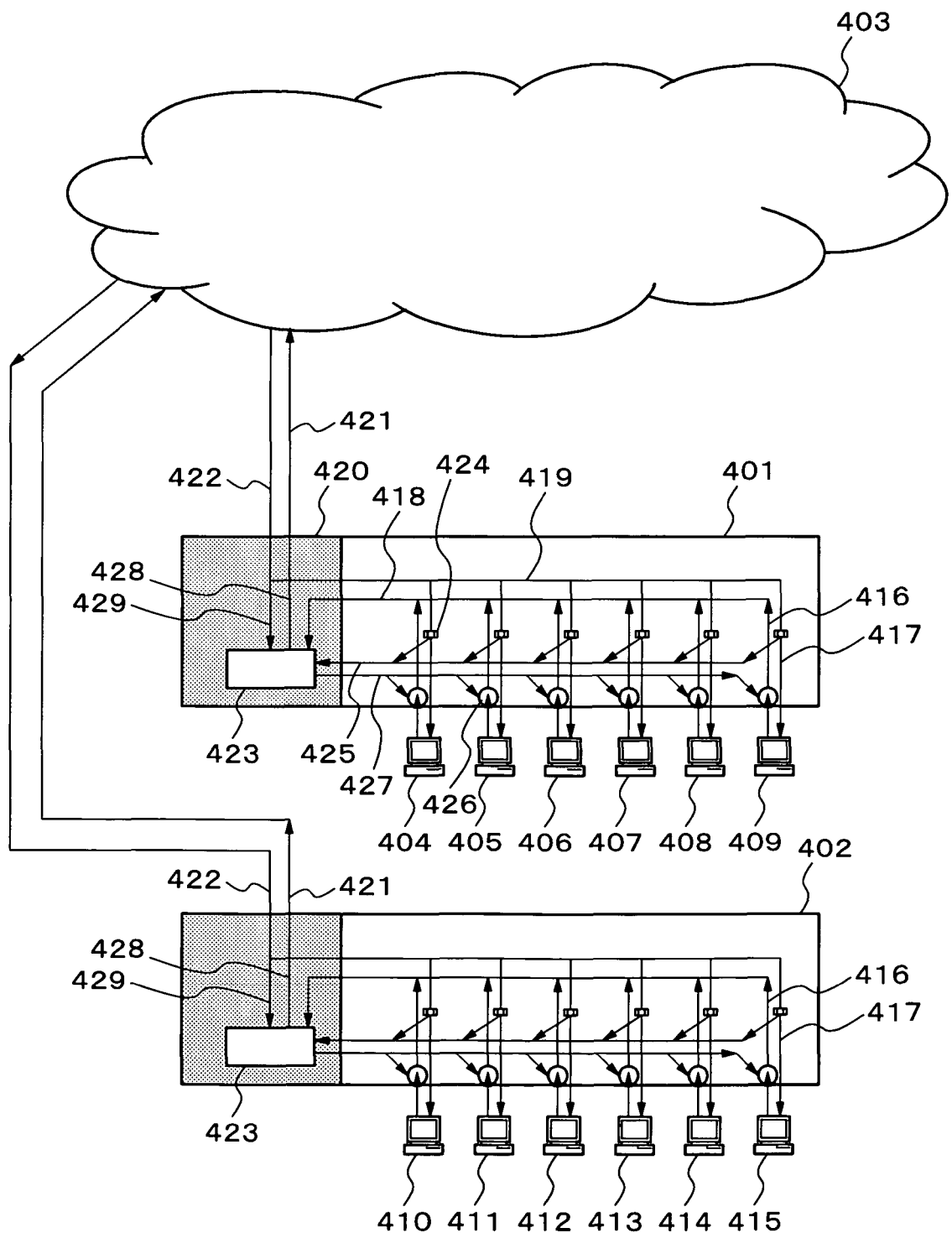
FIG. 4 is a diagram showing a system constitution of a bandwidth control system according to an exemplary aspect of the present invention.

First, features of the bandwidth control system according to this exemplary aspect will be explained with reference to FIG. 4. FIG. 4 is a diagram showing an entire constitution of a bandwidth control system in which bandwidth control apparatuses 401 and 402 according to this exemplary aspect are implemented as two access multiplexers. The respective bandwidth control apparatuses 401 and 402 correspond to the access multiplexer 106 in FIG. 1.

A bandwidth control apparatus 401 is communicating with a bandwidth control apparatus 402 via a network 403. The bandwidth control apparatus 402 collects information on states of downstream bandwidths (bit rates) of respective access lines accommodated in the apparatus and notifies the remote bandwidth control apparatus 401 of the states of the downstream bandwidths of the respective access lines collected. The bandwidth control apparatus 401, which has received the information on the states of the downstream bandwidths in the bandwidth control apparatus 402, allocates upstream bandwidths of the respective access lines 416 accommodated in the bandwidth control apparatus 401 on the basis of the information received. The bandwidth control apparatus 401 controls the upstream bandwidths of the respective access lines 416 on the basis of the upstream bandwidths allocated. Conversely, the bandwidth control apparatus 401 collects information on states of downstream bandwidths of the respective access lines 417 accommodated in the apparatus and notifies the remote bandwidth control apparatus 402 of the information. The bandwidth control apparatus 402, which has received the information on the states of the downstream bandwidths in the bandwidth control apparatus 401, allocates upstream bandwidths of the respective access lines accommodated in the bandwidth control apparatus 402 on the basis of the information received and controls the upstream bandwidths. This makes it possible to dynamically and optimally control the bandwidths of the respective access lines to realize effective utilization of the bandwidths.

The bandwidth control system according to this exemplary aspect will be described further in detail with reference to the drawings.

User terminals 404 to 409 connect to the bandwidth control apparatus 401. User terminals 410 to 415 connect to the bandwidth control apparatus 402.

Reference numeral 416 denotes input signals from the user terminals 404 to 409 to the bandwidth control apparatus 401, that is, upstream signals of the access lines. Reference numeral 417 denotes outputs from the bandwidth control apparatus 401 to the user terminals 404 to 409, that is, downstream signals of the access lines. Reference numeral 418 denotes an intra-apparatus bus for the upstream signals. Reference numeral 419 denotes an intra-apparatus bus for the downstream signals.

Reference numeral 420 denotes a concentration unit and reference numeral 422 denotes a multiplexed signal of the downstream signals. Reference numeral 423 denotes an intra-apparatus control unit. Reference numeral 424 denotes a line bit rate measuring unit, which measures bit rates of the downstream signals of the access lines. Reference numeral 425 denotes an intra-apparatus control signal for collecting the bit rates measured by the line bit rate measuring unit 424. Reference numeral 428 denotes a multiplexed signal of the upstream signals including an inter-apparatus control signal for transmitting line bit rate information of the bandwidth control apparatus 401 to the remote bandwidth control apparatus 402.

Reference numeral 426 denotes a bandwidth limiting unit, which limits bandwidths of the upstream signals of the access lines. Reference numeral 427 denotes an intra-apparatus control signal for controlling the bandwidth limiting unit 426. Reference numeral 429 denotes a multiplexed signal of the downstream signals including an inter-apparatus control signal for receiving line bit rate information of the remote bandwidth control apparatus 402.

Concerning the downstream signals, the bandwidth control apparatus 401 broadcasts the multiplexed signal 422 received from the network 403 to the every access lines 417 via the intra-apparatus bus 419 of the downstream signals in the bandwidth control apparatus 401.

Concerning the upstream signals, in the concentration unit 420, the bandwidth control apparatus 401 inserts an inter-apparatus control signal described later into the upstream signals from the respective access lines 416 and multiplexes the signals in which the inter-apparatus control signal is inserted into an overhead part of user data. The bandwidth control apparatus 401 outputs the signal 428 multiplexed by the concentration unit 420 to the network side as a multiplexed signal 421.

Figure 5:
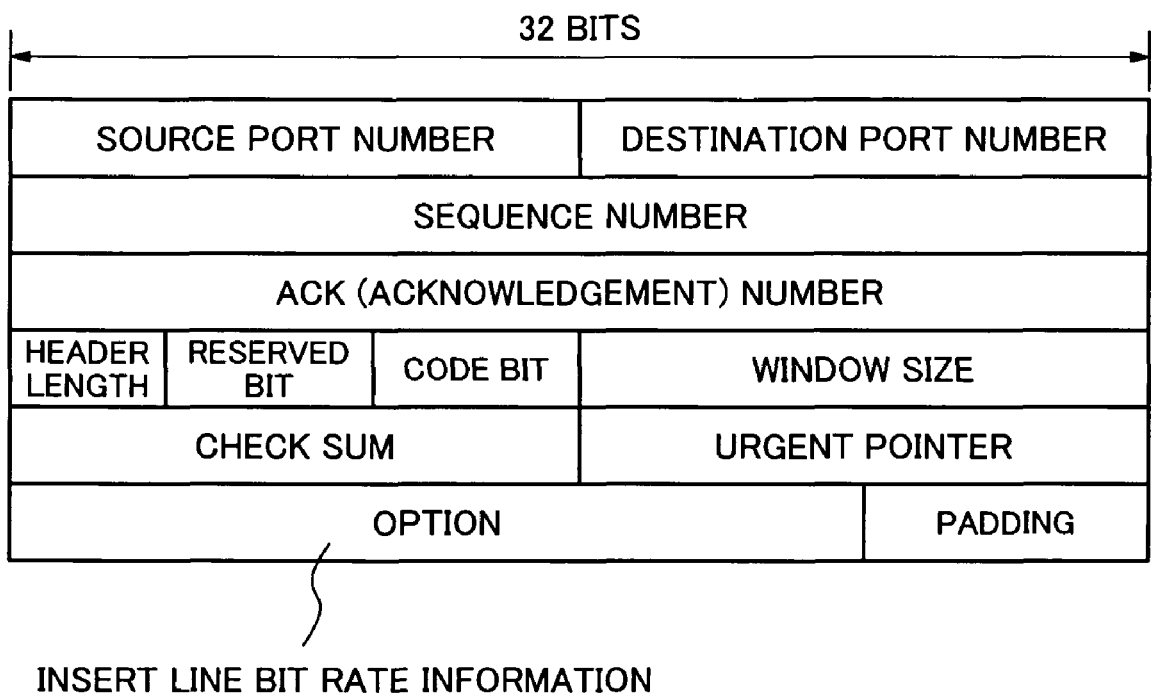
FIG. 5 is a diagram showing a TCP header usage for transmitting an inter-apparatus control signal between bandwidth control apparatuses according to the exemplary aspect of the present invention.

FIG. 5 is a diagram showing a TCP header in which the inter-apparatus controls signals 428 and 429 exchanged by the bandwidth control apparatuses 401 and 402 are inserted. As shown in FIG. 5, the bandwidth control apparatuses 401 and 402 exchange the inter-apparatus signals using an Option field of the TCP header of IP packet exchanged for user data on the access lines 416 and 418 of the user terminals 404 to 409 and 410 to 415.

The intra-apparatus control unit 423 of the bandwidth control apparatus 401 collects, via the intra-apparatus control signal 425, bit rate information of the respective access lines measured by the line bit rate measuring unit 424. The intra-apparatus control unit 423 inserts bit rate information of the downstream signals of the access lines by rewriting Option fields of TCP headers of packets of the upstream signals on the access lines and transmits the bit rate information as an inter-apparatus control signal.

A processing operation in the bandwidth control system according to this exemplary aspect will be explained more in detail with reference to FIG. 6.

Figure 6:
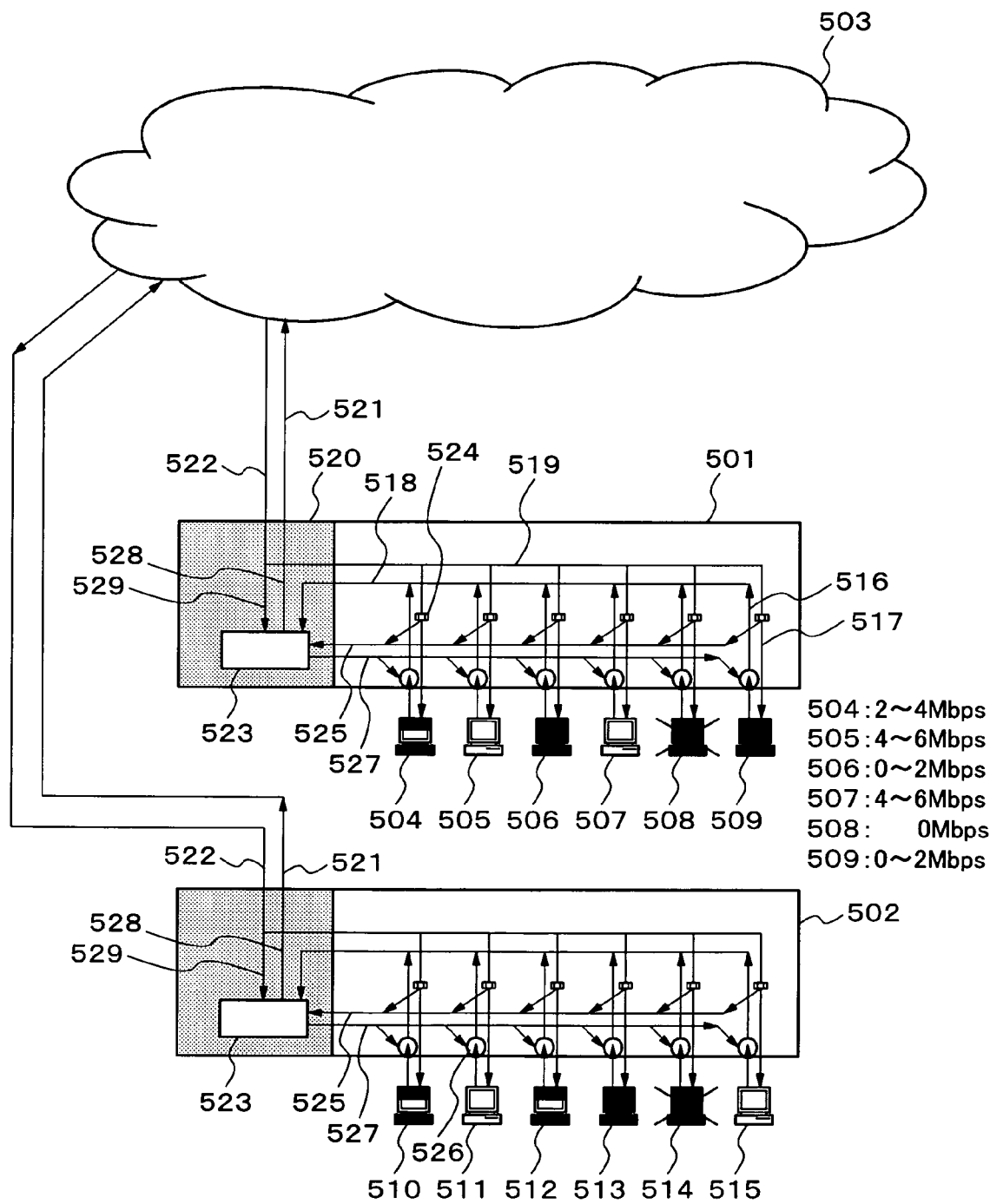
FIG. 6 is a diagram showing an operation example of the bandwidth control system according to the exemplary aspect of the present invention.

FIG. 6 is a diagram showing a state in which bandwidth control apparatuses 501 and 502 perform communications each other in a one to one relation via a network 503 and user terminals in the corresponding positions of each bandwidth control apparatuses 501 and 502 are communicating with each other. A user terminal 504 and a user terminal 510, a user terminal 505 and a user terminal 511, a user terminal 506 and a user terminal 512, a user terminal 507 and a user terminal 513, a user terminal 508 and a user terminal 514, and a user terminal 509 and a user terminal 515 are communicating with each other.

In FIG. 6, the user terminals 504 to 509 and 510 to 515 are indicated by four kinds of symbols corresponding to bit rates of downstream signals of access lines of the user terminals. Bit rates of the downstream signals of the access lines are classified into four groups of bit rates, namely, a bit rate of 0 Mbps (line disconnection) 508, bit rates of 0 Mbps to 2 Mbps 506 and 509, a bit rate of 2 Mbps to 4 Mbps 504, and bit rates of 4 Mbps to 6 Mbps 505 and 507. The user terminals are indicated by symbols corresponding to the respective groups of bit rates. The bit rates are classified into the four groups bit rates as an example for explanation. A different number of classifications may be adopted. As described later, the number of classifications depends on the number of bits dedicated to an inter-apparatus control signal for transmission of information on line bit rates.

Line bit rates of the downstream signals are measured by line bit rate measuring units 524 of the bandwidth control apparatus 501. The line bit rates measured are effective rates of user terminals of the respective access lines. The line bit rate measuring units 524 measure line bit rates of downstream signals of access lines 517 and transmits the line bit rates measured to an intra-apparatus control unit 523 via an intra-apparatus control signal 525.

The intra-apparatus control unit 523 receives the intra-apparatus control signal 525 and obtains line bit rates of the downstream access lines measured by the respective line bit rate measuring units 524. The intra-apparatus control unit 523 classifies the line bit rates collected into four groups. The intra-apparatus control unit 523 gives weighted numbers corresponding to the line bit rates of the access lines to a result of the classification. For example, the intra-apparatus control unit 523 gives a value "0" to an effective rate of 0 Mbps (line disconnection), a value "1" to an effective rate of 0 Mbps to 2 Mbps, a value "2" to an effective rate of 2 Mbps to 4 Mbps, and a value "3" to an effective rate of 4 Mbps to 6 Mbps.

In the case of the user terminals 504 to 509 of the bandwidth control apparatus 501, the intra-apparatus control unit 523 gives weighted numbers of "2", "3", "1", "3", "0", and "1" to line bit rates of the downstream signals of the user terminals 504, 505, 506, 507, 508, and 509, respectively.

Subsequently, the intra-apparatus control unit 523 embeds bit rate information of the downstream signals of the respective access lines 517 accommodated in the bandwidth control apparatus 501 in upstream signals as an inter-apparatus control signal 528 and transmits the bit rate information to the remote bandwidth control apparatus 502. More specifically, the intra-apparatus control unit 523 inserts the bit rate information of the downstream signals of the access lines accommodated in the bandwidth control apparatus 501 by rewriting Option fields of TCP headers of IP packets of the upstream signals and transmits the bit rate information to the remote bandwidth control apparatus 502. The bandwidth control apparatus 501 sends out the upstream signals including inter-apparatus control signal 528 in the TCP header to the network as a multiplexed signal 521.

Figure 7:
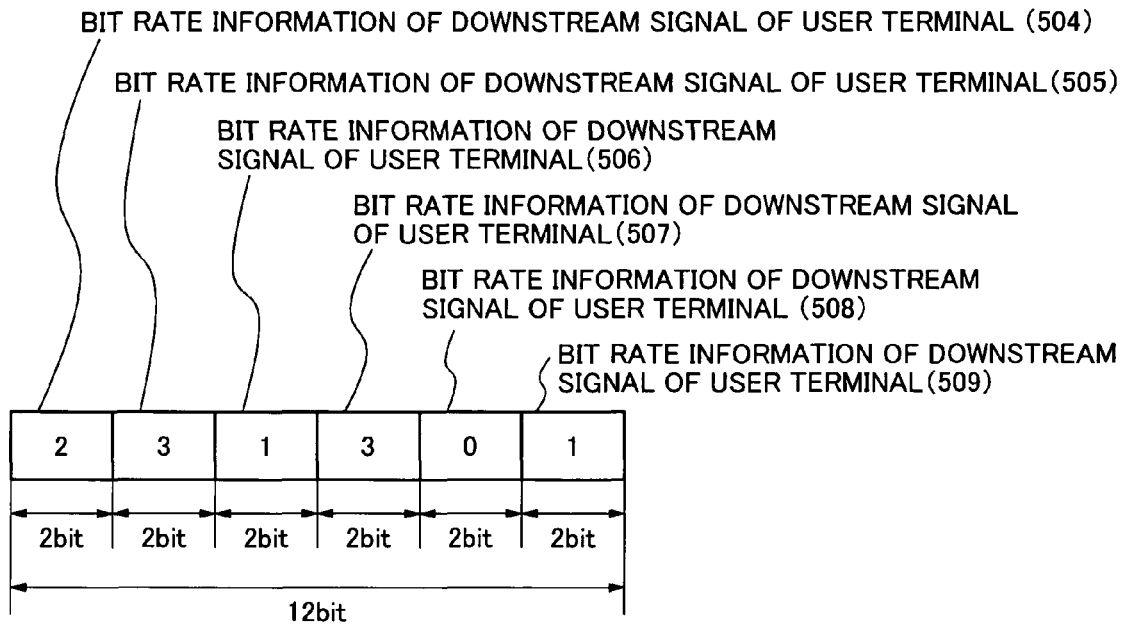
FIG. 7 is a diagram showing an inter-apparatus control signal in the bandwidth control system according to the exemplary aspect of the present invention.

FIG. 7 is a diagram showing the inter-apparatus control signal 528 transmitted to the remote bandwidth control apparatus 502 by the intra-apparatus control unit 523 of the bandwidth control apparatus 501. As shown in FIG. 7, the inter-apparatus control signal 528 includes bit rate information of downstream signals corresponding to all the user terminals 505 to 509 connected to the access lines accommodated in the bandwidth control apparatus 501. In other words, TCP headers of all IP packets transmitted from the bandwidth control apparatus 501 to the bandwidth control apparatus 502 include inter-apparatus control signals having common content shown in FIG. 7 for example.

In general, when the number of accommodated access lines of the bandwidth control apparatuses 501 and 502 is n (n is an integer) and bit rates of the respective access lines are classified into m groups (m is an integer), as shown in FIG. 7, ([log·m+1])×n bits are required for the bandwidth control apparatuses 501 and 502 to transmit bit rate information of all the access lines accommodated therein. [ ] is a Gaussian symbol and a base of the logarithm is 2. When m is a power of 2, the calculating formula becomes [log·m]×n. In the case of the bandwidth control system according to this exemplary aspect in FIG. 6, [log 4]×6=12 bits are required for the bandwidth control apparatuses 501 and 502 to transmit bit rate information of all the access lines accommodated therein.

In this way, in this exemplary aspect, information on bit rates of the downstream signals of the access lines are exchanged between the bandwidth control apparatuses using the Option fields of the TCP headers of IP packets of the upstream signals.

When IP headers are used instead of the TCP headers, a problem described below is likely to occur. For example, when an apparatus on a route between the bandwidth control apparatuses 501 and 502, for example, a Network Address Translator (NAT) rewrites IP headers, and causes a problem. Information inserted in the IP headers is likely to be removed because of the rewriting by the NAT. Therefore, it is preferable to use the TCP headers rather than the IP headers for transmission of the information on the bit rates of the downstream signals of the access lines.

At the remote side, in the bandwidth control apparatus 502 communicating with bandwidth control apparatus 501 via the network, an intra-apparatus control unit 530 receives an inter-apparatus control signal 529 from the bandwidth control apparatus 501. More specifically, the intra-apparatus control unit 530 monitors Option fields of TCP headers of TCP packets of downstream signals and retrieves information on bit rates of the downstream signals of the access lines 517 of the bandwidth control apparatus 501.

Subsequently, the intra-apparatus control unit 530 allocates bandwidths to the respective access lines accommodated in the bandwidth control apparatus 502 on the basis of the information on the bit rates of the downstream signals of the access lines 517 of the bandwidth control apparatus 501 received.

The user terminals 510 to 515 of the access lines accommodated in the bandwidth control apparatus 502 are communicating with the user terminals 504 to 509 of the access lines accommodated in the bandwidth control apparatus 501 via the network 503. Line bit rates of the downstream signals in the user terminals 504 to 509 are indicated by weighted numerical values as 2, 3, 1, 3, 0, and 1 in the inter-apparatus control signal received from the bandwidth control apparatus 501. The communications with the user terminals 504 to 509 is all of the communications of the user terminals 510 to 515 under the bandwidth control apparatus 502. Thus, a sum value 10 of the weighted values is a total required bandwidth of the upstream signals of the access lines accommodated in the bandwidth control apparatus 502.

When a bandwidth that can be allocated to the upstream signals of the access lines accommodated in the bandwidth control apparatus 502 is, for example, 10 Mbps, the intra-apparatus control unit 530 allocates bandwidths to the access lines corresponding to the weighted numerical values of user terminals 510 to 515 as described below.

A required bandwidth of the upstream signal of the access line of the user terminal 510 is a weighted numerical value 2 derived from the inter-apparatus control signal received from the remote bandwidth control apparatus 501. Therefore, the intra-apparatus control unit 530 allocates the bandwidth of 2 to the access lines of the user terminal 510 with respect to the total of required bandwidths 10 of the upstream signals of all the access lines of the bandwidth control apparatus 502. In other words, the intra-apparatus control unit 530 allocates bandwidths to the respective access lines according to proportional distribution. Specifically, since 10 Mbps×2/10=2 Mbps, the intra-apparatus control unit 530 allocates an upstream bandwidth of 2 Mbps to the access line of the user terminal 510. When upstream bandwidths are allocated to the access lines of the other user terminals 511 to 515 in the same manner, bandwidths to be allocated are 3, 1, 3, 0, and 1 Mbps, respectively.

A method for the bandwidth control apparatus 502 to associated each numerical weighted values in the inter-apparatus control signal received with respective access lines accommodated in the bandwidth control apparatus 502 will be described later.

After determining bandwidth to be allocated to the respective access lines, the intra-apparatus control unit 530 transmits an intra-apparatus control signal 527 to respective bandwidth limiting units 526 on the basis of the bandwidths determined and controls bandwidths of the upstream signals of the access lines.

In the bandwidth control apparatus 501, as in the bandwidth control apparatus 502, bandwidths of the upstream signals of the access lines accommodated in the bandwidth control apparatus 501 are controlled on the basis of the information on the bit rates of the downstream signals of the access lines from the bandwidth control apparatus 502.

The bandwidth control apparatus 502 transmits line bit rate information of the downstream signal of the access lines of the user terminals 510 to 515 to the bandwidth control apparatus 501. The bandwidth control apparatus 501 controls line bit rates of the upstream signals of the access lines of the user terminals 504 to 509 on the basis of the corresponding line bit rate information of the downstream signals received from the bandwidth control apparatus 502.

Figure 11:
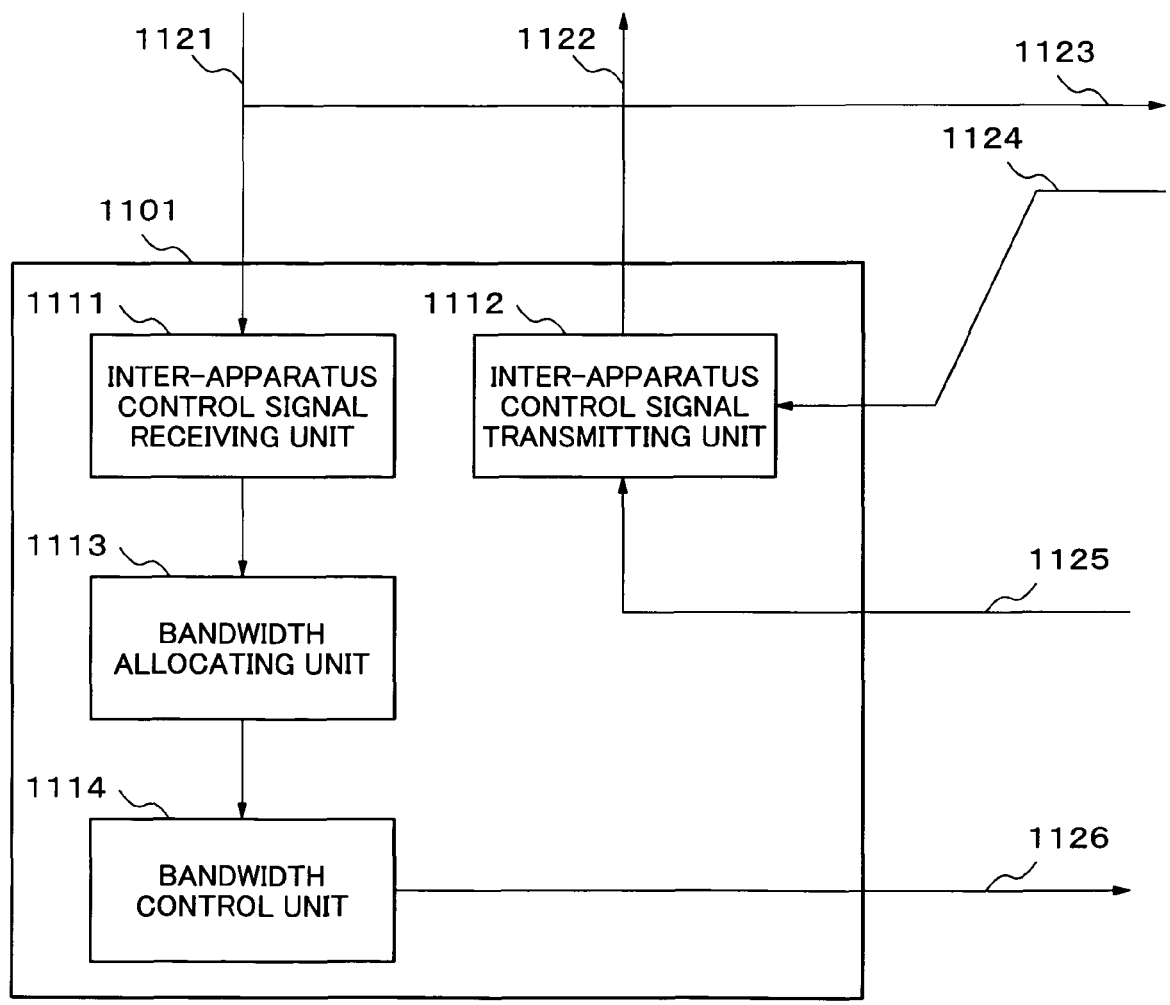
FIG. 11 is a diagram showing an intra-apparatus control unit in the bandwidth control apparatus according to the exemplary aspect of the present invention.

FIG. 11 is a diagram showing details of the intra-apparatus control units 523 and 530.

Reference numeral 1101 in FIG. 11 indicates the intra-apparatus control units 523 and 530. Reference numerals 1121 and 1122 denotes a downstream signal and an upstream signal of the bandwidth control apparatuses 501 and 502 including an inter-apparatus control signal, respectively. The downstream signal 1121 is broadcast to the user terminals 504 to 509 and 510 to 515 of the access lines accommodated in the bandwidth control apparatuses 501 and 502 through an intra-apparatus bus 1123. Simultaneously, an inter-apparatus control signal receiving unit 1111 also receives the downstream signal 1121.

The inter-apparatus control signal receiving unit 1111 associates each numerical weighted values, which are read out from the inter-apparatus control signal, with the local access lines respectively using a method described later. A bandwidth allocating unit 1113 allocates bandwidths of the upstream signals of the access lines (the user terminals) on the basis of the numerical weighted values read out from the inter-apparatus control signal receiving unit 1111. A bandwidth control unit 1114 controls the bandwidths of the upstream signals of the access lines (the user terminals) in accordance with the allocation of the bandwidths by the bandwidth allocating unit 1113.

An inter-apparatus control signal transmitting unit 1112 obtains information on effective rates of the downstream signals of the respective user terminals measured by line bit rate measuring units (e.g., 524) of the bandwidth control apparatuses 501 and 502 via an inter-apparatus control signal 1125. The inter-apparatus control signal transmitting unit 1112 classifies and weights the information on the effective rates of the respective user terminals obtained. Subsequently, the inter-apparatus control signal transmitting unit 1112 inserts the bit rate information of the downstream signals weighted, identification numbers of the bandwidth control apparatuses described later, and identification numbers of the access lines into a TCP header of an upstream signal 1124 of the access lines (the user terminals) as an inter-apparatus control signal and outputs the inter-apparatus control signal as a signal 1122. Thereafter, the upstream signal 1122 from the respective access lines (user terminals) in which the inter-apparatus control signal is inserted is multiplexed by concentration units (e.g., the concentration unit 420 of the bandwidth control apparatus 501) of the bandwidth control apparatuses 501 and 502 and transmitted to the network as a multiplexed signal (e.g., the multiplexed signal 521 of the bandwidth control apparatus 501).

In this way, in the bandwidth control system according to this exemplary aspect, each of the bandwidth control apparatuses 501 or 502 is capable of transmitting the line bit rates of the downstream signals of the access lines accommodated in the apparatus to the remote bandwidth control apparatus 502 or 501 and controlling bandwidth of the upstream signals of the access lines accommodated in the own apparatus on the basis of the information on the line bit rates transmitted from the remote bandwidth control apparatus 502 or 501.

A supplementary explanation of this exemplary aspect will be given below.

First, an identification method among a plurality of bandwidth control apparatuses in the case in which the plurality of bandwidth control apparatus perform communications with one another will be explained.

As explained above, in the bandwidth control system according to this exemplary aspect, one bandwidth control apparatus 501 and one bandwidth control apparatus 502 performs communications with each other in a one to one relation via the network 503. When n bandwidth control apparatuses and m bandwidth control apparatuses perform communications with one another, the plurality of bandwidth control apparatus transmit inter-apparatus control signals to one bandwidth control apparatus. The bandwidth control apparatus, which has received the inter-apparatus control signal from the plurality of other bandwidth control apparatuses, has to identify which of the bandwidth control apparatuses has transmitted each of the inter-apparatus control signals.

Figure 8:
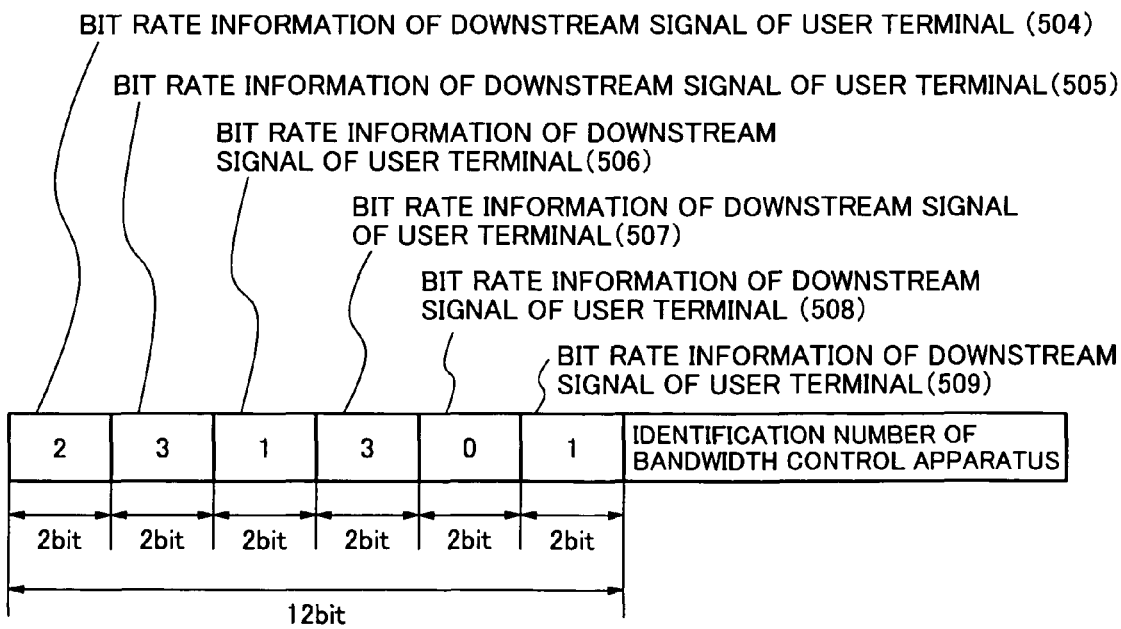
FIG. 8 is a diagram showing an inter-apparatus control signal in the bandwidth control system according to the exemplary aspect of the present invention.

Thus, in this exemplary aspect, the bandwidth control apparatus 501 or 502 includes an identification number of the bandwidth control apparatus in the inter-apparatus control signal together with information on line bit rates and transmits the inter-apparatus control signal to the remote bandwidth control apparatus 502 or 501. The bandwidth control apparatus 502 or 501, which has received the inter-apparatus control signal, identifies the remote bandwidth control apparatus of the inter-apparatus control signal based both on the identification number of the bandwidth control apparatus 501 or 502 included in the inter-apparatus control signal received and source IP address included in an IP header of the inter-apparatus control signal. An inter-apparatus control signal including an identification number of a bandwidth control apparatus in the bandwidth control system according to this exemplary aspect is shown in FIG. 8.

A reason for using not only the identification number of the bandwidth control apparatus 501 or 502 included in the inter-apparatus control signal but also the source IP address included in the IP header in combination will be explained below.

It is difficult to identify the bandwidth control apparatus 501 or 502 using only the identification number of the bandwidth control apparatus 501 or 502 included in the inter-apparatus control signal. This is because there is no mechanism or system in the present Internet to govern uniqueness of identification number of the bandwidth control apparatus 501 or 502 within the Internet.

It is also difficult to identify the bandwidth control apparatus 501 or 502 using only the source IP address included in the IP header to specify a bandwidth control apparatus that has transmitted the inter-apparatus control signal.

This is because, as described above, an apparatus such as an NAT on a route of the network is likely to rewrite the IP header including the transmission source IP address.

The source IP address is unique in the Internet. However, when the NAT on the route translated the source IP addresses of packets from a plurality of bandwidth control apparatus to another source IP addresses for example, the bandwidth control apparatus 501 or 502 receives the inter-apparatus control signals from a plurality of bandwidth control apparatus all of whose source IP addresses are same. Therefore, in order to identify a plurality of bandwidth control apparatuses corresponding to the reduced IP addresses by NATs, identification numbers of the bandwidth control apparatuses are also used.

Therefore, the bandwidth control apparatus 501 or 502 according to this exemplary aspect uses both the identification number of the bandwidth control apparatus included in the inter-apparatus control signal and the source IP address of IP header to specify a bandwidth control apparatus that has transmitted the inter-apparatus control signal.

In this way, in this exemplary aspect, when the n bandwidth control apparatuses and the m bandwidth control apparatuses are performing communications with one another, a bandwidth control apparatus, which has received an inter-apparatus control signal, identifies the transmission source bandwidth control apparatus of the inter-apparatus control signal.

A supplementary explanation of the identification method for a plurality of access lines accommodated by the bandwidth control apparatus 501 or 502 will be given below.

In the above explanation about this exemplary aspect, the user terminals 510 to 515 and the user terminals 504 to 509 are communicating in association with each other. The method according to this exemplary aspect explained above is effective when it is known which the user terminals 504 to 509 of the bandwidth control apparatus 501 performs communications with which the user terminals 510 to 515 of the remote bandwidth control apparatus 502.

However, unlike the case described above, when user terminals connected to one another on access lines of the bandwidth control apparatus 501 or 502 communicate with arbitrary user terminals, it is necessary to recognize which user terminal of the bandwidth control apparatus 501 or 502 is communicating with which user terminal of the remote bandwidth control apparatus 502 or 501 communicating with the bandwidth control apparatus 501 or 502.

In this exemplary aspect, to identify an access line of the bandwidth control apparatuses 501 and 502, identification numbers of access lines given uniquely within the respective bandwidth control apparatuses are used.

Since the identification numbers of the access lines are unique within the respective bandwidth control apparatuses, the following explanation uses an example case in which plurality of the bandwidth control apparatuses perform communications one another. That is, in the case where plurality of the bandwidth control apparatuses are communicating one another, a bandwidth control apparatus identifies a remote bandwidth control apparatus and an access line of the remote bandwidth control apparatus, and then identifies a corresponding access line in the own bandwidth control apparatus.

First, a method of transmitting an inter-apparatus control signal will be explained.

In the case of the communications pattern described above, it is unnecessary to identify both a bandwidth control apparatus and an access line, the intra-apparatus control unit inserts inter-apparatus control signals having common content into TCP headers of all upstream signals to be transmitted. On the other hand, in the case of a communications pattern, it is necessary to identify a bandwidth control apparatus and an access line, the intra-apparatus control unit 523 inserts inter-apparatus control signals having contents corresponding to the respective access lines into TCP headers of upstream signals of the respective access lines. In other words, the intra-apparatus control unit 523 inserts inter-apparatus control signals having contents different for each of the access lines into the upstream signals rather than inserting inter-apparatus control signals having common content into all the TCP header of the upstream signals.

Figure 9:
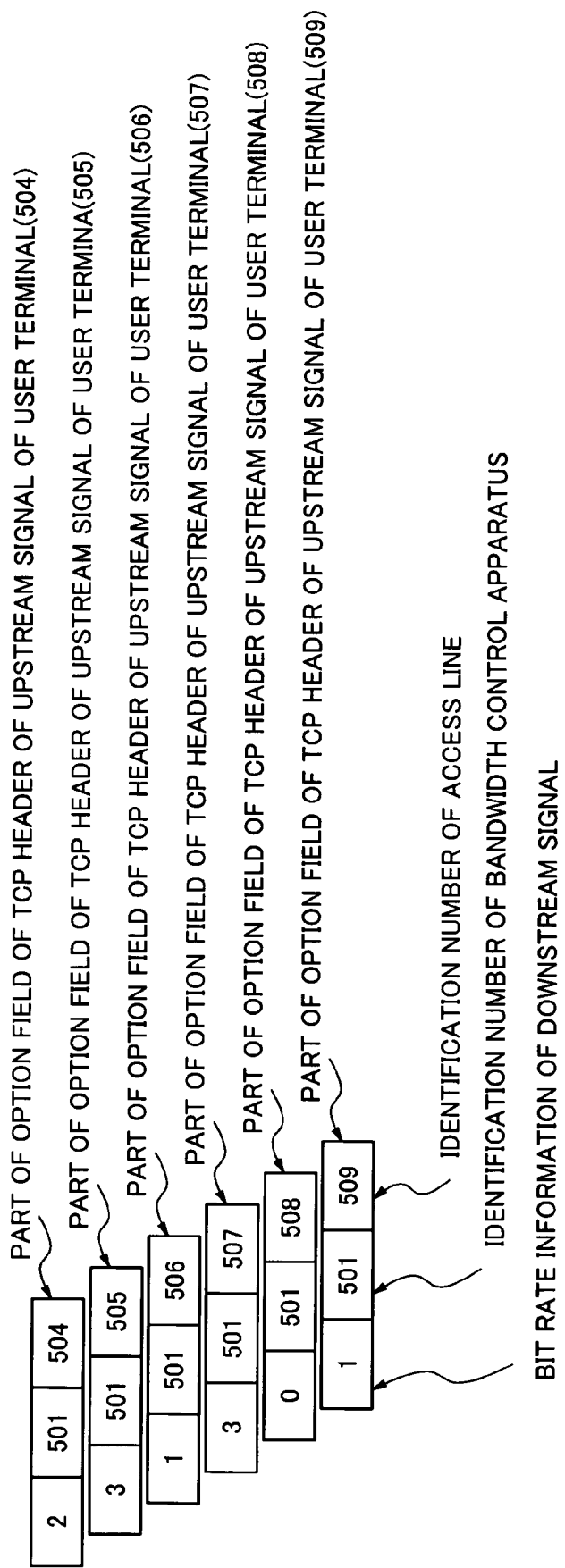
FIG. 9 is a diagram showing inter-apparatus control signals in the bandwidth control system according to the exemplary aspect of the present invention.

An example of inter-apparatus control signals in the case in which identification numbers of access lines are used is shown in FIG. 9. In FIG. 9, to facilitate understanding of the figure, an identification number of a bandwidth control apparatus and identification numbers of access lines are the same as those in FIG. 6. As shown in FIG. 9, for example, the inter-apparatus control unit 523 inserts bit rate information of a downstream signal of the user terminal 504 into an Option field of a TCP header of an upstream signal from the user terminal 504 as an inter-apparatus control signal and transmits the bit rate information to the bandwidth control apparatus 502.

The intra-apparatus control unit 523 includes a bandwidth control apparatus identification number of the bandwidth control apparatus 501 and respective identification numbers of corresponding access lines, in addition to bit rate information of downstream signals of the access line, to an inter-apparatus control signal to be transmitted to the remote bandwidth control apparatus 502.

At the same time, the intra-apparatus control unit 523 stores, on every TCP sessions communicated on the respective access lines, a source port number and a source IP address of the TCP session in a not-shown memory in association with the respective access lines. When a user terminal connected to one access line is communicating with a plurality of destinations and a plurality of TCP sessions are established, the intra-apparatus control unit 523 stores, for one access line, a plurality of source port numbers and a plurality of source IP addresses corresponding to the plurality of TCP sessions in the not-shown memory.

The intra-apparatus control unit 530 in the remote bandwidth control apparatus 502, which receives an inter-apparatus control signal from the bandwidth control apparatus 501, also stores an access line correspondence table, which is the same as the one stored by the intra-apparatus control unit 523 of the bandwidth control apparatus 501, in a not-shown memory.

An example of the access line correspondence table of the intra-apparatus control unit 530 of the bandwidth control apparatus 502 is shown in FIG. 10. FIG. 10 is an access line correspondence table stored in the not-shown memory of the bandwidth control apparatus 502. FIG. 10 indicates that four TCP connections exist on an access line to which the user terminal 510 is connected.

Receiving an inter-apparatus control signal, first, the intra-apparatus control unit 530 of the bandwidth control apparatus 502 identifies the bandwidth control apparatus 501 as the transmission source of the inter-apparatus control signal. The intra-apparatus control unit 530 performs the identification of the transmission source bandwidth control apparatus 501 using both a source IP address of an IP packet which includes the inter-apparatus identification signal and a bandwidth control apparatus identification number retrieved from the inter-apparatus identification signal.

Subsequently, the intra-apparatus control unit 530 identifies a remote access line of the bandwidth control apparatus 501 corresponding to the inter-apparatus control signal, using an access line identification number read out from the received inter-apparatus control signal. Since the access line identification number is unique within the respective bandwidth control apparatuses, the same access line identification number is possibly used in other bandwidth control apparatuses. Therefore, the intra-apparatus control unit 530 identifies an access line of a unique bandwidth control apparatus by matching the access line identification number with the bandwidth control apparatus identification number simultaneously identified.

The intra-apparatus control unit 530 identifies a local access line of the bandwidth control apparatus 502 on which information of the received inter-apparatus control signal should be reflected. The intra-apparatus control unit 530 reads out a destination IP address from an IP header of the IP packet including the TCP header in which the received inter-apparatus control signal is inserted and reads out a destination TCP port number from the TCP header. The intra-apparatus control unit 530 lookup the destination IP address and the destination TCP port number on the source IP addresses and the TCP source port numbers respectively in the access line correspondence table stored in the not-shown memory. The intra-apparatus control unit 530 identifies a local access line, for which the destination IP address of the received inter-apparatus control signal and the source IP address of the access line correspondence table coincide with each other and the TCP destination port number of the received inter-apparatus control signal and the TCP source port number of the access line correspondence table coincide with each other, as a local access line on which the information of the received inter-apparatus control signal should be reflected in the bandwidth control apparatus 502.

As a result, the intra-apparatus control unit 523 identifies the bandwidth control apparatus 501 as the transmission source of the inter-apparatus control signal, a remote access line of the bandwidth control apparatus 501, and a local access line of the bandwidth control apparatus 502 using the destination IP address, the bandwidth control apparatus identification number, the access line identification number, and the destination TCP port number from the received inter-apparatus control signal.

With such a method, in the bandwidth control system according to this exemplary aspect, when the m bandwidth control apparatuses and the n bandwidth control apparatuses are communicating with one another, a bandwidth control apparatus on a reception side of an inter-apparatus control signal identifies a local access line on which information of the inter-apparatus control signal should be reflected.

A supplementary explanation will be given about a method with which, when any one of the user terminals 504 to 509 and 510 to 515 is communicating with a plurality of user terminals, the bandwidth control apparatus 501 or 502, which has received a plurality of inter-apparatus control signals, calculates an optimum upstream bandwidth of one access line. Four methods will be described below.

A first method is a method of simply adding and totaling bit rate information of downstream signals of all remote access lines. In other words, upstream bandwidths simply proportional to the bit rate information of the downstream signals of the remote sides, which is a weighted index, are allocated. This method copes with a situation in which the local user terminal simultaneously communicates with all the remote end user terminals in a bandwidth equal to effective rates of the remote ends, that is, a maximum communication bit rate. The first method is suitable when downstream bandwidth resources of remote destinations are more precious than upstream bandwidth resources.

A second method is a method of using a maximum effective rate in line bit rate information of all the user terminals at the remote destinations is used as a required upstream bandwidth. This method is suitable when communication between the user terminal and the respective user terminals at the remote destinations are intermittent and the user terminal does not simultaneously communicate with a plurality of remote destinations.

A third method is a method of totaling line bit rate information of all the user terminals at the remote destinations and, then, dividing the total by the number of opposed destinations to calculate an average. In the third method, upstream bandwidths are controlled according to an average of bit rate information of downstream bandwidths of a plurality of remote destinations. Therefore, downstream resources of remote destinations having effective rates larger than the average are excessive. Upstream bandwidth on a transmission side is insufficient for remote destinations having effective rates smaller than the average. The third method is suitable when the user terminal does not simultaneously communicate with a plurality of users at remote destinations so often and does not always communicate at an effective rate.

A fourth method is a method with which the intra-apparatus control unit 523 or 530 identifies an application from a TCP port number of a TCP session monitored by the intra-apparatus control unit 523 or 530 and calculates an weighted average using a predetermined value weighted according to the application. This makes it possible to perform bandwidth allocation taking into account characteristics of the application.

With the methods described above, when the bandwidth control apparatus receives a plurality of pieces of bit rate information from the remote bandwidth control apparatuses, concerning one local access line of the bandwidth control apparatus, the bandwidth control apparatus calculates a required upstream bandwidth of the access line.

As described above, in the bandwidth control system according to this exemplary aspect, the bandwidth control apparatus 501 or 502 collects line bit rates of downstream signals of the access lines accommodated therein and transmits information on the line bit rates of the downstream signals of the access lines collected to the remote bandwidth control apparatus 502 or 501. The remote bandwidth control apparatus 502 or 501 optimally allocates bandwidths of upstream signals of respective access lines of the bandwidth control apparatus and controls the bandwidths on the basis of the information on the line bit rates of the downstream access lines. Consequently, the bandwidths of the upstream signals of the access lines accommodated in the respective bandwidth control apparatuses are appropriately distributed. This makes it possible to effectively utilize upstream bandwidth resources of the respective bandwidth control apparatuses. Specifically, it is possible to prevent occurrence of excess upstream bandwidths or insufficient upstream bandwidths due to inconsistency between upstream bandwidth of access lines and downstream bandwidths of remote destinations and prevent a waste of bandwidths due to useless traffics.

In this way, in the bandwidth control system according to this exemplary aspect, it is possible to efficiently use network resources.

In general, a Network Management System (NMS) or the like may allocate and set bandwidths of upstream signals of access lines of an access multiplexer.

However, with such a conventional bandwidth allocation method by the NMS, it is difficult for the access multiplexer, that is, the bandwidth control apparatus according to this exemplary aspect to dynamically change and control allocation of bandwidths of access lines accommodated therein according to an operation state of access lines of a remote bandwidth control apparatus, or according to operation/non-operation status of signals of the access lines.

As compared with conventional bandwidth allocation method by the NMS, in the bandwidth control system according to this exemplary aspect, information on line bit rates of downstream signals of access lines of the bandwidth control apparatus 501 or 502 via the network 503 is notified to the remote bandwidth control apparatus 502 or 501. The remote bandwidth control apparatus 502 or 501 dynamically allocates and controls bandwidths of upstream signals of access lines accommodated in the bandwidth control apparatus using the information on the line bit rates received from the bandwidth control apparatus 501 or 502.

Therefore, the bandwidth control system according to this exemplary aspect has an excellent characteristic that time required for a bandwidth control apparatus to reflect information on line bit rates of downstream signals of access lines of a remote bandwidth control apparatus on dynamic allocation and control of bands of access lines of the bandwidth control apparatus is far shorter than that in the conventional bandwidth allocation method by the NMS.

Moreover, the bandwidth control system according to this exemplary aspect is capable of changing bandwidth allocation of access lines more frequently than the conventional bandwidth allocation method by the NMS.

For example, it is also possible to execute the series of processing from the processing for notifying a remote bandwidth control apparatus of information on line bit rates of downstream signals of access lines to the processing for dynamically allocating and controlling upstream bands of access lines of a bandwidth control apparatus that receives the notice as frequently as occurrence of TCP packets on the access line.

The exemplary aspect described above does not limit a scope of the invention to the exemplary aspect only. It is possible to carry out the invention in various modified forms without departing from the spirit of the invention.

For example, it is also possible to execute the processing operation in the access multiplexer according to the exemplary aspect with software such as a computer program rather than a hardware configuration. It is also possible to cause an information processing apparatus to execute the processing operation by recording the program in a recording medium such as an optical recording medium, a magnetic recording medium, a magneto-optical recording medium, or semiconductor and causing the information processing apparatus to read the program from the recording medium. It is also possible to cause the information processing apparatus to execute the processing operation by causing the information processing apparatus to read a program from an external device connected to the information processing apparatus via a predetermined network.

In the bandwidth control system according to the exemplary aspect, the access multiplexer for access lines used in communication of a packet switching system is described. However, the invention is also applicable to an access multiplexer for access lines used in communication of a circuit switching system. When the invention is applied to the access multiplexer in communication of the circuit switching system, a line state and an effective rate is notified and controlled using an overhead of a main signal in the same manner as using the TCP header in the exemplary aspect.

Moreover, it is also possible to connect access multiplexers through separate lines (separate networks) such as control plane and perform the same notification and control as the exemplary aspect without using the overhead of the main signal for the notification and control of a line state and an effective rate.

This application is based on Japanese Patent Application No. JP2005-171107 filed on Jun. 10, 2005, and including a specification, claims, drawings and summary. The disclosure of the above Japanese Patent Application is incorporated herein by reference in its entirety.

What is claimed is:

1. A bandwidth control system including a plurality of bandwidth control apparatuses, each of which concentrates a plurality of access lines into a multiplexed line connected to a network and each of which communicates with another bandwidth control apparatus via the network by controlling a bandwidth of the respective access lines accommodated in the respective bandwidth control apparatus, the bandwidth control system comprising:

a first bandwidth control apparatus which collects information on downstream bandwidth states of respective access lines accommodated in the first bandwidth control apparatus and notifies, via the network, bandwidth control apparatuses, which are communicating with the first bandwidth control apparatus, of the collected information on the downstream bandwidth states of the respective access lines; and a second bandwidth control apparatus which receives the information on the downstream bandwidth states notified by the first bandwidth control apparatus, allocates upstream bandwidths to respective access lines accommodated in the second bandwidth control apparatus on a basis of the received information on the downstream bandwidth states, and controls the allocated upstream bandwidths of the respective access lines of the second bandwidth control apparatus.

2. The bandwidth control system according to claim 1, wherein the first bandwidth control apparatus notifies the downstream bandwidth states of the respective access lines accommodated in the first bandwidth control apparatus with a weighting information classified into a plurality of groups corresponding to states of use, and wherein the second bandwidth control apparatus distributes and allocates the upstream bandwidths of the respective access lines accommodated in the second bandwidth control apparatus on the basis of a ratio of the weighting information.

3. The bandwidth control system according to claim 2, wherein the first bandwidth control apparatus inserts the downstream bandwidth states of the respective access lines accommodated in the first bandwidth control apparatus into upstream signals of the respective access lines, multiplexes the upstream signals of the respective access lines with the downstream bandwidth states inserted therein, and notifies the second bandwidth control apparatus of the downstream bandwidth states.

4. The bandwidth control system according to claim 2, wherein the first bandwidth control apparatus inserts the downstream the first bandwidth control apparatus into positions, which correspond to the respective access lines, of an Option field of a TCP header of an upstream signal transmitted from the first bandwidth control apparatus, respectively, and notifies the second bandwidth control apparatus of the downstream bandwidth states, and wherein the second bandwidth control apparatus controls, on the basis of the downstream bandwidth states inserted in the positions, which correspond to the respective access lines accommodated in the first bandwidth control apparatus, of the Option field of the TCP header notified from the first bandwidth control apparatus, upstream bandwidths of the respective access lines accommodated in the second bandwidth control apparatus corresponding to the downstream bandwidth states.

5. The bandwidth control system according to claim 2, wherein the first bandwidth control apparatus inserts the downstream bandwidth states of the respective access lines accommodated in the first bandwidth control apparatus into positions, which correspond to the respective access lines, of an Option field of a TCP header of an upstream signal transmitted from the first bandwidth control apparatus and notifies the second bandwidth control apparatus of the bandwidth states together with a bandwidth control apparatus identification number for identifying the first bandwidth control apparatus, and wherein the second bandwidth control apparatus specifies the first bandwidth control apparatus from a source IP address of an IP packet including a TCP header notified from the first bandwidth control apparatus and the bandwidth control apparatus identification number notified together with the downstream bandwidth states and controls, on the basis of the downstream bandwidth states inserted in the positions, which correspond to the respective access lines accommodated in the first bandwidth control apparatus specified, of the Option field of the TCP header, upstream bandwidths of the respective access lines accommodated in the second bandwidth control apparatus corresponding to the downstream bandwidth states.

6. The bandwidth control system according to claim 2, wherein the first bandwidth control apparatus inserts downstream bandwidth states of the respective access lines accommodated in the first bandwidth control apparatus, a bandwidth control apparatus identification number for identifying the first bandwidth control apparatus, and access line identification numbers for identifying the access lines into an Option field of a TCP header of an upstream signal corresponding to the access lines and notifies the second bandwidth control apparatus of the downstream bandwidth state, the bandwidth control apparatus identification number, and the access line identification numbers, and wherein the second bandwidth control apparatus specifies an access line accommodated in the second bandwidth control apparatus for which a destination IP address of an IP packet including the TCP header notified from the first bandwidth control apparatus and a destination port number of the TCP header and a source IP address and a source port number of a TCP session stored in advance in association with the access lines accommodated in the second bandwidth control apparatus coincide with each other, identifies, from the bandwidth control apparatus identification number and the access line identification number, an access line accommodated in the first bandwidth control apparatus corresponding to the access line accommodated in the second bandwidth control apparatus specified, and controls, on the basis of the downstream bandwidth states of the respective access lines accommodated in the first bandwidth control apparatus identified, an upstream bandwidth of the access line accommodated in the second bandwidth control apparatus specified.

7. The bandwidth control system according to claim 6, wherein when there are a plurality of TCP sessions corresponding to one access line accommodated in the second bandwidth control apparatus, the second bandwidth control apparatus performs one of the control operations for controlling the upstream bandwidth of the access line accommodated in the second bandwidth control apparatus, in which:

a control operation on the basis of totaled bandwidths indicated by the downstream bandwidth states of all the access lines accommodated in the first bandwidth control apparatus identified by the corresponding TCP session, a control operation on the basis of a maximum bandwidth state among the downstream bandwidth states of all access lines accommodated in the first bandwidth control apparatus identified by the corresponding TCP session, a control operation on the basis of an average of bandwidths indicated by the downstream bandwidth states of all the access lines accommodated in the first bandwidth control apparatus identified by the corresponding TCP session, and a control operation on the basis of a weighted average of bandwidths indicated by the downstream bandwidth states of all the access lines accommodated in the first bandwidth control apparatus identified by the corresponding TCP session.

8. A bandwidth control apparatus which concentrates a plurality of access lines into a multiplexed line connecting to network and controls bandwidths of the respective access lines accommodated by the bandwidth control apparatus, the bandwidth control apparatus comprising:

a bandwidth state transmitting unit that collects downstream bandwidth states of the respective access lines accommodated in the bandwidth control apparatus and notifies, via the network, other bandwidth control apparatuses, which are communicating with the bandwidth control apparatus, of the downstream bandwidth states of the respective access lines collected;

a bandwidth allocating unit that acquires downstream bandwidth states of the respective access lines, which are accommodated in the other bandwidth control apparatuses, notified by the other bandwidth control apparatuses, which are communicating with the bandwidth control apparatus via the network, and allocates, on the basis of the bandwidth states acquired, upstream bandwidths of the respective access lines accommodated in the bandwidth control apparatus; and a bandwidth control unit that controls upstream bandwidths of the respective access lines accommodated in the bandwidth control apparatus according to the bandwidth allocated by the bandwidth allocating unit.

9. The bandwidth control apparatus according to claim 8, wherein the bandwidth state transmitting unit includes:

a line bit rate measuring unit that measures bit rates of downstream signals of the respective access lines accommodated in the bandwidth control apparatus; and an inter-apparatus control signal transmitting unit that collects the bit rates of the downstream signals of the respective access lines measured by the line bit rate measuring unit and notifies the other bandwidth control apparatuses of the downstream bandwidth states including weighting information classified into a plurality of groups corresponding to the bit rates, and the bandwidth allocating unit acquires the bandwidth states notified by the other bandwidth control apparatuses which communicates with the bandwidth control apparatus and distributes and allocates, on the basis of a ratio of the weighting information included in the bandwidth states acquired, upstream bandwidths of the respective access lines accommodated in the bandwidth control apparatus.

10. The bandwidth control apparatus according to claim 9, wherein the inter-apparatus control signal transmitting unit inserts the downstream bandwidth states of the respective access lines accommodated in the bandwidth control apparatus into upstream signals of the respective access lines, multiplexes the upstream signals of the respective access lines with the bandwidth states inserted therein, and notifies the other bandwidth control apparatuses of the downstream bandwidth states.

11. The bandwidth control apparatus according to claim 9, wherein the inter-apparatus control signal transmitting unit inserts the downstream bandwidth states of the respective access lines accommodated in the bandwidth control apparatus into positions, which correspond to the respective access lines, of an Option field of a TCP header of an upstream signal transmitted from the bandwidth control apparatus, respectively, and notifies the other bandwidth control apparatuses of the downstream bandwidth states, and wherein the bandwidth allocating unit controls, on the basis of the downstream bandwidth states inserted in the positions, which correspond to the respective access lines accommodated in the other bandwidth control apparatuses, of the Option field of the TCP header notified from the other bandwidth control apparatuses, upstream bandwidths of the respective access lines accommodated in the bandwidth control apparatus corresponding to the downstream bandwidth states.

12. The bandwidth control apparatus according to claim 9, wherein the inter-apparatus control signal transmitting unit inserts the downstream bandwidth states of the respective access lines accommodated in the bandwidth control apparatus into positions, which correspond to the respective access lines, of an Option field of a TCP header of an upstream signal transmitted from the bandwidth control apparatus, respectively, and notifies the other bandwidth control apparatuses of the downstream bandwidth states together with a bandwidth control apparatus identification number for identifying a transmission source bandwidth control apparatus, and wherein the bandwidth allocating unit specifies the transmission source bandwidth control apparatus from a source IP address of an IP packet including a TCP header notified from the other bandwidth control apparatuses and the bandwidth control apparatus identification number notified together with the downstream bandwidth states and controls, on the basis of the downstream bandwidth states inserted in the positions, which correspond to the respective access lines accommodated in the transmission source bandwidth control apparatus specified, of the Option field of the TCP header, upstream bandwidths of the respective access lines accommodated in the bandwidth control apparatus corresponding to the downstream bandwidth states.

13. The bandwidth control apparatus according to claim 9, wherein the bandwidth state transmitting unit further includes a storing unit that stores source IP addresses and source port numbers of a TCP session corresponding to the respective access lines accommodated in the bandwidth control apparatus, wherein the inter-apparatus control signal transmitting unit inserts downstream bandwidth states of the respective access lines accommodated in the bandwidth control apparatus, a bandwidth control apparatus identification number for identifying the transmission source bandwidth control apparatus, and access line identification numbers for identifying the access lines into an Option field of a TCP header of an upstream signal corresponding to the access lines and notifies the other bandwidth control apparatuses of the downstream bandwidth state, the bandwidth control apparatus identification number, and the access line identification numbers, and wherein the bandwidth allocating unit compares a destination IP address of an IP packet including a TCP header notified from the other bandwidth control apparatuses and a destination port number of the TCP header and a source IP address and a source port number of the TCP session stored in advance in the storing unit and specifies an access line accommodated in the bandwidth control apparatus for which the destination IP address and the destination port number and the source IP address and the source port number coincide with each other, identifies, from the bandwidth control apparatus identification number and the access line identification number, an access line accommodated in the other bandwidth control apparatus corresponding to the specified access line accommodated in the bandwidth control apparatus, and controls, on the basis of a downstream bandwidth state of the access line accommodated in the other bandwidth control apparatus identified, an upstream bandwidth of the specified access line accommodated in the bandwidth control apparatus.

14. The bandwidth control apparatus according to claim 13, wherein when there are a plurality of TCP sessions stored in the storing unit corresponding to one access line accommodated in the bandwidth control apparatus, the bandwidth allocating unit performs one of control operations for controlling the upstream bandwidth of the access line in the bandwidth control apparatus, in which:

a control operation on the basis of totaled bandwidths indicated by the downstream bandwidth states of all the access lines accommodated in the other bandwidth control apparatus identified by the corresponding TCP session, a control operation on the basis of a maximum bandwidth state among the downstream bandwidth states of all access lines accommodated in the other bandwidth control apparatus identified by the corresponding TCP session, a control operation on the basis of an average of bandwidths indicated by the downstream bandwidth states of all the access lines accommodated in the other bandwidth control apparatus identified by the corresponding TCP session, and a control operation on the basis of a weighted average of bandwidths indicated by the downstream bandwidth states of all the access lines accommodated in the other bandwidth control apparatus identified by the corresponding TCP session.

15. A bandwidth control method of controlling, when a plurality of bandwidth control apparatuses, each concentrating a plurality of access lines into a multiplexed line connecting to a network and communicating with one another via the network, bandwidths of each of the access lines accommodated in the respective bandwidth control apparatuses, the bandwidth control method comprising:

a collecting step of collecting downstream bandwidth states of the respective access lines accommodated in the bandwidth control apparatus;

a notifying step of notifying, via the network, other bandwidth control apparatus, of the downstream bandwidth states of the respective access lines collected;

an acquiring step of acquiring the downstream bandwidth states of the respective access lines accommodated in the other bandwidth control apparatuses notified by the other bandwidth control apparatuses, which is communicating with the bandwidth control apparatus via the network;
a bandwidth allocating step of allocating upstream bandwidths of the respective access lines accommodated in the bandwidth control apparatus on the basis of the downstream bandwidth states acquired; and
a bandwidth control step of controlling the upstream bandwidths, of the respective access lines accommodated in the bandwidth control apparatus in accordance with the allocated bandwidths.

16. The bandwidth control method according to claim 15, wherein the collecting step includes a step of measuring bit rates of downstream signals of the respective access lines accommodated in the bandwidth control apparatus and a weighting step of giving a weighting information classified into a plurality of groups corresponding to the bit rates of the downstream signals of the respective access lines measured, and
wherein the bandwidth allocating step includes:
a distributing and allocating step of acquiring the downstream bandwidth states notified by the other bandwidth control apparatuses and distributing and allocating, on the basis of a ratio of the weighting information included in the downstream bandwidth states acquired, upstream bandwidths of the respective access lines accommodated in the bandwidth control apparatus.

17. The bandwidth control method according to claim 16, wherein the notifying step includes an inserting and multiplexing step of inserting the downstream bandwidth states of the respective access lines accommodated in the bandwidth control apparatus into upstream signals of the respective access lines, multiplying the upstream signals of the respective access lines with the downstream bandwidth states inserted therein, and notifying the other bandwidth control apparatuses of the bandwidth states.

18. The bandwidth control method according to claim 16, wherein the notifying step includes an inserting step of inserting the downstream bandwidth states of the respective access lines accommodated in the bandwidth control apparatus into positions, which correspond to the respective access lines, of an Option field of a TCP header of an upstream signal transmitted from the bandwidth control apparatus, respectively, and notifying the other bandwidth control apparatuses of the bandwidth states, and
wherein the bandwidth control step includes a control step of controlling, on the basis of the downstream bandwidth states inserted in the positions, which correspond to the respective access lines accommodated in the other bandwidth control apparatuses, of the Option field of the TCP header notified from the other bandwidth control apparatuses, upstream bandwidths of the respective access lines accommodated in the bandwidth control apparatus corresponding to the bandwidth states.

19. The bandwidth control method according to claim 16, wherein the notifying step includes an inserting step of inserting the downstream bandwidth states of the respective access lines accommodated in the bandwidth control apparatus into positions, which correspond to the respective access lines, of an Option field of a TCP header of an upstream signal transmitted from the bandwidth control apparatus, respectively, and notifying the other bandwidth control apparatuses of the downstream bandwidth states together with a bandwidth control apparatus identification number for identifying a transmission source bandwidth control apparatus, and
wherein the bandwidth control step includes a control step of specifying the transmission source bandwidth control apparatus from a source IP address of an IP packet including a TCP header notified from the other bandwidth control apparatuses and the bandwidth control apparatus identification number notified together with the downstream bandwidth states and controlling, on the basis of the downstream bandwidth states inserted in the positions, which correspond to the respective access lines accommodated in the transmission source bandwidth control apparatus specified, of the Option field of the TCP header, upstream bandwidths of the respective access lines accommodated in the bandwidth control apparatus corresponding to the downstream bandwidth states.

20. The bandwidth control method according to claim 16, wherein the notifying step includes:
a storing step of storing source IP addresses and source port numbers of a TOP session corresponding to the respective access lines accommodated in the bandwidth control apparatus; and
an inserting step of inserting downstream bandwidth states of the respective access lines accommodated in the bandwidth control apparatus, a bandwidth control apparatus identification number for identifying the transmission source bandwidth control apparatus, and access line identification numbers for identifying the access lines into an Option field of a TCP header of an upstream signal corresponding to the access lines and notifying the other bandwidth control apparatuses of the downstream bandwidth state, the bandwidth control apparatus identification number, and the access line identification numbers, and
wherein the bandwidth control step includes:
an apparatus accommodating access line specifying step of comparing a destination IP address of an IP packet including a TCP header notified from the other bandwidth control apparatuses and a destination port number of the TCP header and a source IP address and a source port number of the TCP session stored in advance in the storing step and specifying an access line accommodated in the bandwidth control apparatus for which the destination IP address and the destination port number and the source IP address and the source port number coincide with each other;
a step of identifying, from the bandwidth control apparatus identification number and the access line identification number, an access line accommodated in the transmission source bandwidth control apparatus corresponding to the access line specified in the apparatus accommodating access line specifying step; and
a step of controlling, on the basis of a downstream bandwidth state of the access line identified in the transmission source apparatus access line identifying step, an upstream bandwidth of the access line specified in the apparatus accommodating access line specifying step.

21. The bandwidth control method according to claim 20, wherein when there area plurality of TCP sessions stored in the storing step corresponding to one access line accommodated in the bandwidth control apparatus, the bandwidth control step includes one of control steps controlling the upstream bandwidth of the access line in the bandwidth control apparatus, in which:
totaling bandwidths indicated by the downstream bandwidth states of all the access lines accommodated in the transmission source bandwidth control apparatuses identified and controlling an upstream bandwidth of the access line accommodated in the bandwidth control apparatus specified on the basis of the totaled bandwidths, controlling an upstream bandwidth of the access line accommodated in the bandwidth control apparatus specified on the basis of a maximum bandwidth state among the downstream bandwidth states of all the access lines accommodated in the transmission source bandwidth control apparatuses identified, and controlling an upstream bandwidth of the access line accommodated in the bandwidth control apparatus specified on the basis of an average of bandwidth indicated by the downstream bandwidth states of all the access lines accommodated in the transmission source bandwidth control apparatuses identified and controlling an upstream bandwidth of the access line accommodated in the bandwidth control apparatus specified on the basis of a weighted average bandwidths indicated by the downstream bandwidth states of all the access lines accommodated in the transmission source bandwidth control apparatuses identified.

\* \* \* \* \*